United States Patent
Oomura

(10) Patent No.: US 7,564,206 B2
(45) Date of Patent: Jul. 21, 2009

(54) MOTOR POSITIONING UNIT

(75) Inventor: Naoki Oomura, Shizuoka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 108 days.

(21) Appl. No.: 11/871,425

(22) Filed: Oct. 12, 2007

(65) Prior Publication Data

US 2008/0152326 A1 Jun. 26, 2008

(30) Foreign Application Priority Data

Dec. 21, 2006 (JP) ............................. 2006-344516

(51) Int. Cl.
 *H02P 6/14* (2006.01)
(52) U.S. Cl. ............................. 318/400.26; 318/400.02
(58) Field of Classification Search ............ 318/400.02, 318/400.26
 See application file for complete search history.

(56) References Cited

U.S. PATENT DOCUMENTS

| | | | | |
|---|---|---|---|---|
| 5,796,228 A | * | 8/1998 | Kojima et al. | 318/605 |
| 6,329,781 B1 | * | 12/2001 | Matsui et al. | 318/717 |
| 6,822,417 B2 | * | 11/2004 | Kawaji et al. | 318/701 |
| 7,151,354 B2 | * | 12/2006 | Yoshinaga et al. | 318/611 |
| 2007/0046249 A1 | * | 3/2007 | Tomigashi et al. | 318/807 |
| 2008/0042614 A1 | * | 2/2008 | Oomura et al. | 318/799 |
| 2008/0111516 A1 | * | 5/2008 | Inokuma | 318/799 |

FOREIGN PATENT DOCUMENTS

JP 2005-292898 A 10/2005
JP 2007-181353 A 7/2007

* cited by examiner

*Primary Examiner*—Bentsu Ro
*Assistant Examiner*—Erick Glass
(74) *Attorney, Agent, or Firm*—Pearne & Gordon LLP

(57) ABSTRACT

A positioning unit including a rotational position detector detecting a rotational position of a motor; a control phase angle generator generating a control phase angle corresponding to the detected rotational position; a rotational speed detector detecting a rotational speed; a position controller calculating a target rotational speed based on a difference between a target stop position and the rotational position and specifying a command d-axis voltage at zero when the difference is greater than a predetermined reference value, and at a predetermined exciting voltage when the difference is equal to or less than the reference value; a speed controller generating a command q-axis voltage based on the difference between the target rotational speed and the rotational speed; a coordinate transformer performing rotational coordinate transformation of the command d-axis voltage and the command q-axis voltage to form a three-phase command voltage; and a conductive signal generator generating three-phase conductive signal.

6 Claims, 6 Drawing Sheets

| SHAFT FRICTION [Nm] | Vd [V] | TEST MOTOR | | | | | | | | | | AVERAGE STABILIZATION TIME [sec] |
|---|---|---|---|---|---|---|---|---|---|---|---|---|
| | | No.1 | No.2 | No.3 | No.4 | No.5 | No.6 | No.7 | No.8 | No.9 | No.10 | |
| 0.0098 | 0 | 3.5 | 3.3 | 3.3 | 3.3 | 3.2 | 3.2 | 3.2 | 3.5 | 3.3 | 3.0 | 3.28 |
| | 2.0 | 2.5 | 2.5 | 2.4 | 2.6 | 2.5 | 2.5 | 2.5 | 2.5 | 2.5 | 2.5 | 2.50 |
| 0.0196 | 0 | 2.7 | 2.8 | 2.8 | 2.7 | 2.6 | 2.8 | 2.7 | 2.7 | 2.8 | 2.7 | 2.73 |
| | 2.0 | 2.2 | 2.2 | 2.5 | 2.4 | 2.4 | 2.3 | 2.4 | 2.4 | 2.3 | 2.4 | 2.35 |
| 0.0294 | 0 | 2.7 | 2.3 | 2.4 | 2.5 | 2.6 | 2.6 | 2.6 | 2.5 | 2.6 | 2.6 | 2.54 |
| | 2.0 | 2.0 | 2.0 | 2.3 | 2.3 | 1.9 | 1.9 | 1.9 | 2.2 | 2.2 | 2.2 | 2.09 |
| 0.0392 | 0 | 2.1 | 2.1 | 2.1 | 2.2 | 2.1 | 2.1 | 2.0 | 2.1 | 2.1 | 2.0 | 2.09 |
| | 2.0 | 1.8 | 1.7 | 1.7 | 1.8 | 1.8 | 1.7 | 1.7 | 1.7 | 1.8 | 1.8 | 1.75 |
| 0.0490 | 0 | 1.8 | 1.8 | 2.3 | 2.3 | 1.8 | 2.3 | 1.8 | 1.8 | 2.3 | 1.8 | 2.00 |
| | 2.0 | 1.8 | 1.8 | 1.8 | 2.2 | 2.1 | 2.0 | 2.0 | 1.8 | 1.8 | 1.8 | 1.91 |

FIG. 5

MOTOR POSITIONING UNIT

This application is based upon and claims the benefit of priority from the prior Japanese Patent Application 2006-344516, filed on, Dec. 21, 2006 the entire contents of which are incorporated herein by reference.

FIELD

The present disclosure is directed to a positioning unit for a brushless DC motor.

BACKGROUND

Load in surveying instruments, surveillance cameras, and semiconductor manufacturing and testing devices require high-precision in their positioning control. Wide spread use of battery driven products has lead to growing demand in both efficient operation and high-precision positioning.

JP 2005-292898 A discloses a positioning control unit that generates command values to be delivered to a servo motor by combining a target position with corrected data generated in advance for absolute positioning control. The corrected data is generated by positioning the servo motor at predetermined constant angles, measuring the specified absolute positioning by a high-resolution encoder, and obtaining angle error data from the encoder position data of the servo motor and the high-resolution encoder position data.

JP 2007-181353 A discloses a surveillance camera driver capable of high-responsive operation employing a step motor and a surveillance camera system. The surveillance camera driver provides feedback on rotational position of the rotor and switches energization of the coil so that voltage induced by the permanent magnet of the step motor and the coil current are placed in a predetermined phase relation. Thus, step-out is less prone to occur and the surveillance camera driver can be driven with high efficiency and high responsiveness. Also, since the surveillance camera driver is provided with a position control loop, coil current flows only when displacement occurs from the target position and no coil current flows when no displacement occurs from the target position. Such arrangement results in less current consumption, thereby providing increased battery drive time.

High precision positioning often involves a drive system employing gears as disclosed in JP 2007-181353 A. Gears are used since provision of a predetermined gear ratio allows positioning precision of the motor itself to be relaxed. However, increasing demand for high efficiency operation requires direct load drive without gears. Since direct load drive often results in lack of motor output torque on the load, it becomes even more difficult to perform high precision positioning against load inertia.

SUMMARY

The present disclosure provides a motor positioning unit capable of high-precision positioning and high-responsiveness.

The motor positioning unit of the present disclosure includes a rotational position detector that detects a rotational position of the brushless DC motor; a control phase angle generator that generates a control phase angle corresponding to the rotational position detected by the rotational position detector; a rotational speed detector that detects a rotational speed based on the rotational position or the control phase angle; a position controller that calculates a target rotational speed based on a difference between a target stop position and the rotational position detected by the rotational position detector and that specifies a command d-axis voltage at zero when the difference is greater than a predetermined reference value, and at a predetermined exciting voltage when the difference is equal to or less than the predetermined reference value; a speed controller generating a command q-axis voltage based on the difference between the target rotational speed and the rotational speed detected by the rotational speed detector; a coordinate transformer that performs rotational coordinate transformation of the command d-axis voltage and the command q-axis voltage by using the control phase angle to form a three phase command voltage; and a conductive signal generator that generates three phase conductive signal for the brushless DC motor based on the three phase command voltage.

According to the above configuration, a predetermined exciting voltage is applied to the d-axis when the difference between the target stop position and the current rotational position is equal to the predetermined reference value or lower. The phase of the current flown in the motor by the d-axis voltage is delayed with respect to the d-axis voltage in response to the vibration of the motor. The q-axis component of the current with delayed phase generates braking torque in the opposite direction relative to the rotational direction of the motor. The braking torque is in positive correlation with rotational speed and has no timing delay (control delay) unlike the torque generated by feedback control. The present disclosure allows high-responsiveness, shortened stabilization time to target stop position and high-precision positioning.

BRIEF DESCRIPTION OF THE DRAWINGS

Other objects, features and advantages of the present disclosure will become clear upon reviewing the following description of the embodiments with reference to the accompanying drawings, in which.

FIG. 5 indicates the test results of positioning control.

DETAILED DESCRIPTION

One embodiment of the present disclosure will be described hereinafter with reference to the drawings.

Figure 1A:
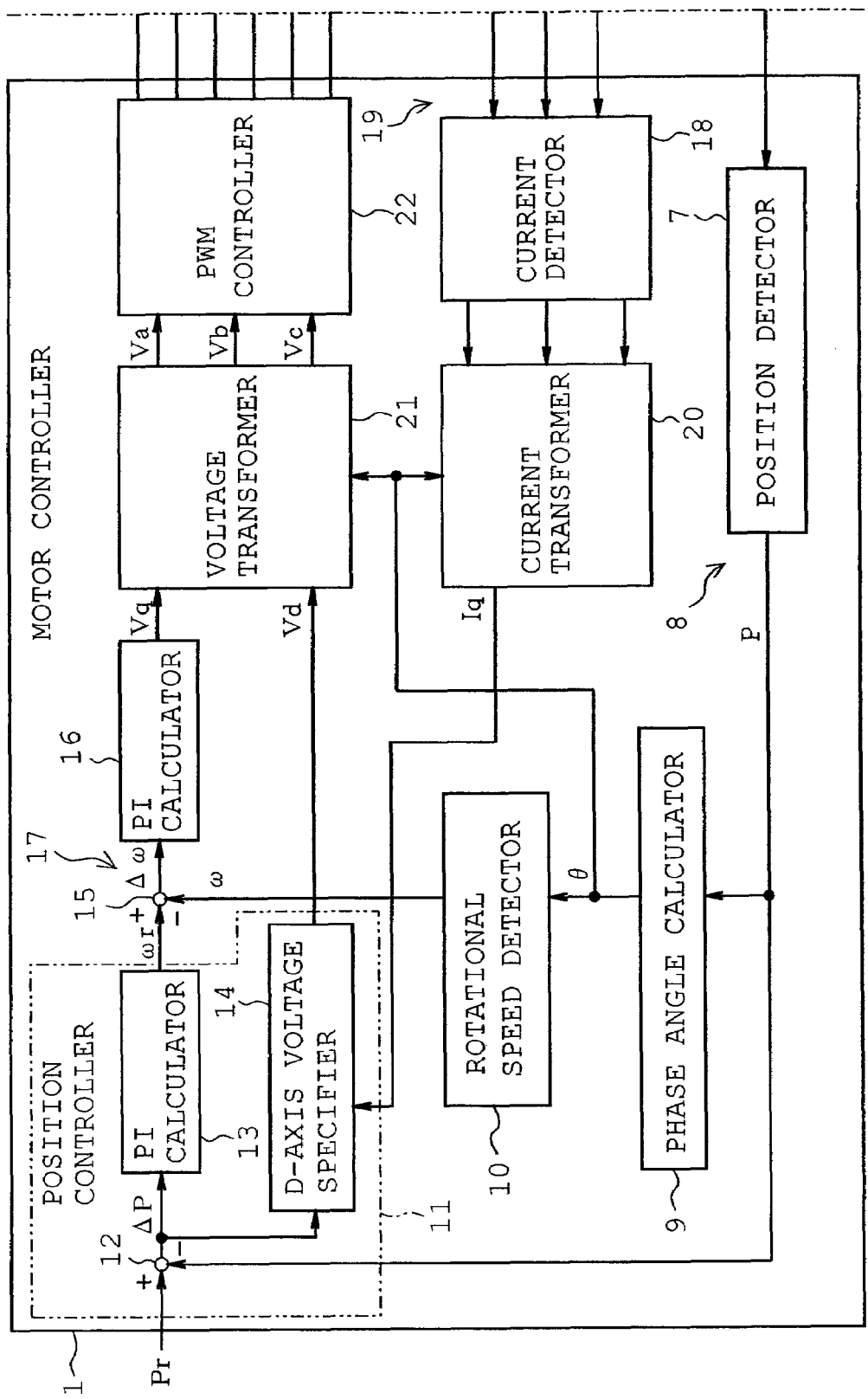
FIGS. 1A and 1B illustrate a system configuration of positioning control indicating one embodiment of the present disclosure.
Figure 1B:
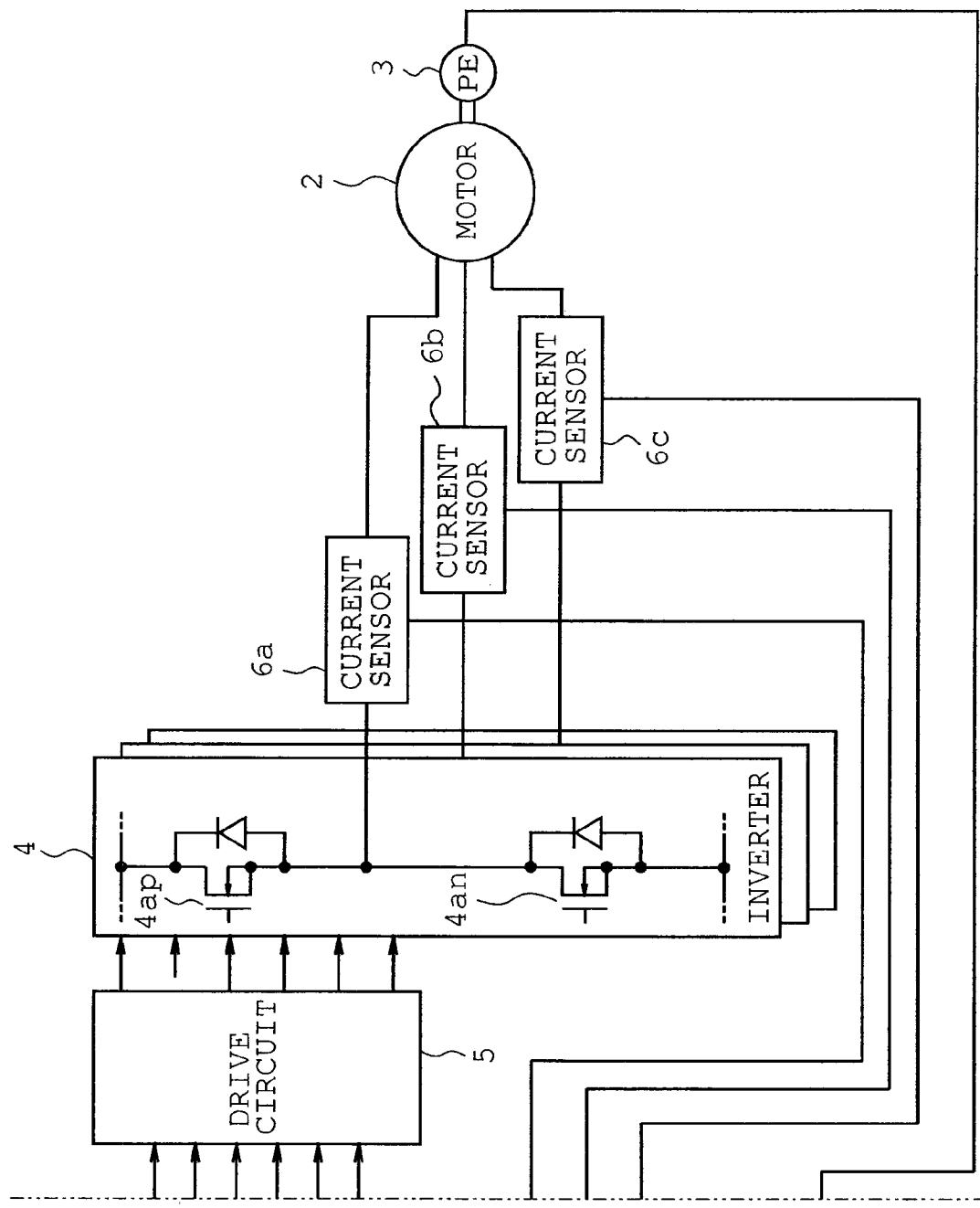

FIGS. 1A and 1B illustrate a system configuration of a motor control system. The motor controller 1 is configured by a high-speed processor (DSP: Digital Signal Processor, for example) and functions as a motor positioning unit of a motor. A brushless DC motor 2 (hereinafter referred to as a motor 2) which is the object of control is a hollow, coreless motor having twenty four poles, for example, and is used in a rotary mechanism for scanning laser beams in a laser surveying device. A high-resolution (1,048,576 pulses/revolution, for example) encoder 3 is mounted on the motor 2 and the output signals SA, SB, and SZ of the encoder 3 are delivered to the motor controller 1. The above exemplified encoder 3 has an angle resolution of approximately 1.236 [sec] per pulse.

The motor 2 is driven by a well-known voltage source inverter 4 configured by connecting six switching elements such as FET 4ap, 4an ... to a 3-phase bridge configuration. A commutating signal outputted from the motor controller 1 is delivered to each gate of FET 4ap, 4an ... via a drive circuit 5. Also, current sensors 6a, 6b, and 6c such as hall CT are provided on each output line connecting the inverter 4 and each phase terminal of the motor 2.

The motor controller 1 is configured by basic components such as CPU and memory; an A/D converter; and peripheral circuits such as timers having PWM calculation functionalities. The motor controller 1 controls the motor 2 by execution of control programs stored in a nonvolatile memory such as a flash memory by the CPU. FIG. 1A illustrates by way of a block diagram the process executed by the motor controller 1. The motor controller 1 executes control of d-axis voltage Vd and q-axis voltage Vq on a dq coordinate axis, the d-axis indicating the axial direction of magnetic flux of the motor 2, the q-axis indicating the axial direction of torque perpendicular to the d-axis.

A position detector 7 along with the aforementioned encoder 3 constitute the rotational position detector 8 and detects position P which is the absolute rotational angle of the rotor of motor 2 based on output signals SA, SB, and SZ delivered from the encoder 3. A phase angle calculator 9 functioning as a control phase angle generator obtains phase angle θ (control phase angle) as an electric angle by multiplying the detected position P by the number of pole pairs (12 in the above motor) of the motor 2. Rotational speed detector 10 detects rotational speed ω based on the phase angle θ or the detected position P.

A position controller 11 is configured by a subtractor 12, a PI calculator 13 and a d-axis voltage specifier 14. When executing a positioning control, the position controller 11 specifies the position control mode at "1" or "2" under the predetermined condition (refer to FIG. 3) as will be described in detail afterwards. The d-axis voltage specifier 14 specifies a d-axis voltage Vd (command d-axis voltage) at zero when in the position control mode 1 and specifies the d-axis voltage Vd (command d-axis voltage) at a predetermined and non-zero exciting voltage when in the position control mode 2.

The subtractor 12 outputs position error ΔP (=command position Pr−detected position P) by subtracting detected position P from a target stop rotational position Pr (hereinafter referred to as command position Pr). The PI calculator 13 generates command rotational speed ωr by performing P calculation or PI calculation. In position control mode 1, P control is executed according to the following equation (1). PosKp1 (Hz/deg) is the proportional gain of the positioning control and (n) indicates the digital control period.

$$\text{command rotational speed } \omega r(n) = (\text{command position } Pr - \text{detected position } P) \times PosKp1 \quad (1)$$

Figure 2:
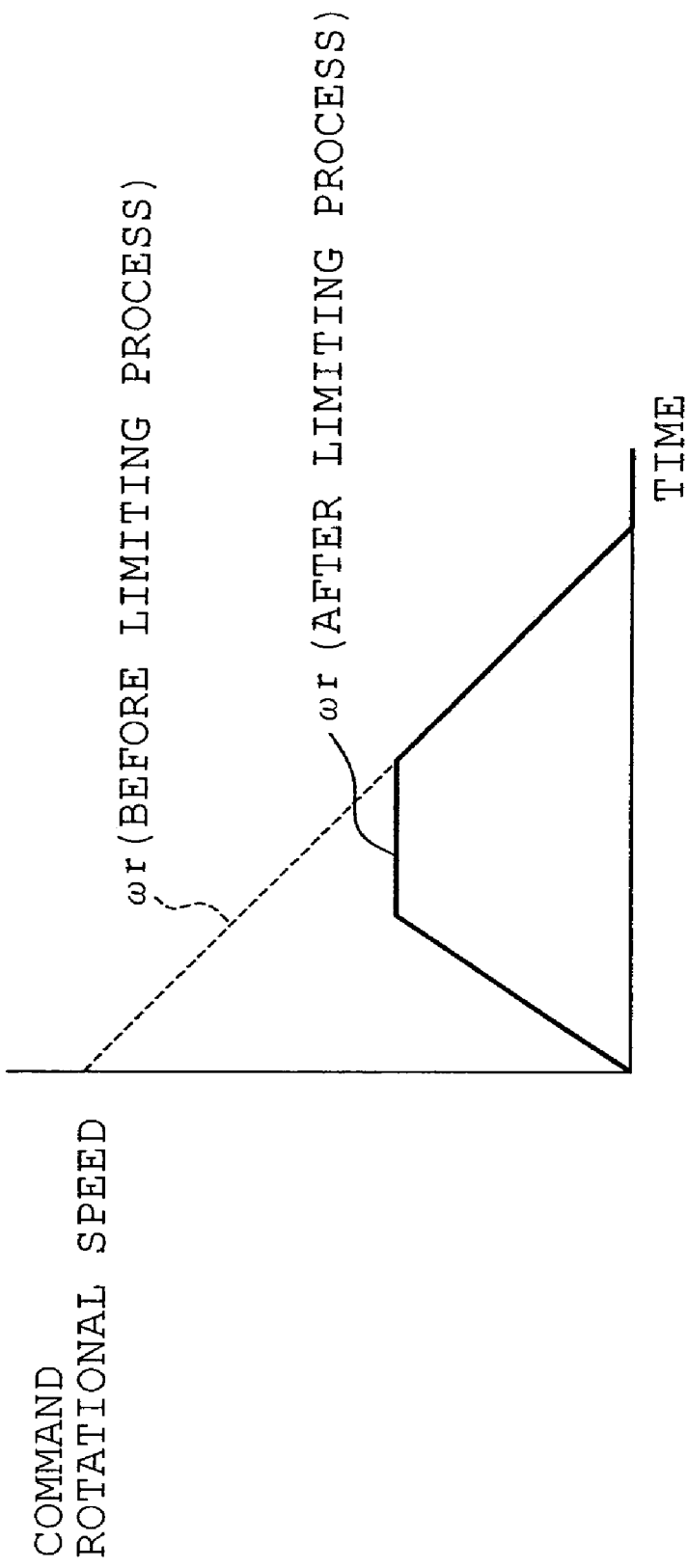
FIG. 2 is a descriptive view of a limit process performed by a PI calculator of a position controller.

When generating command rotational speed ωr from position error ΔP, a limiting process is executed on the value of command rotational speed ωr and its change rate (acceleration) as shown in FIG. 2. In FIG. 2, the lateral axis represents time and the vertical axis represents command rotational speed ωr. For instance, a limiting process is executed on the command rotational speed ωr indicated in a broken line obtained by P calculation to obtain command rotational speed ωr indicated in solid line.

In position control mode 2, PI control is executed according to the following equations (2) and (3). Command rotational speed ωri(n) is an integral term, and PosKp2 (Hz/deg) and PosKi2(Hz·s/deg) are proportional gain and integral gain of positioning control respectively. The above described limiting process is carried out when generating command rotational speed ωr from position error ΔP.

$$\begin{aligned}\text{command rotational speed } \omega ri(n) = \\ \text{command rotational speed } \omega ri(n-1) + \\ (\text{command position } Pr - \text{detected position } P) \times PosKi2\end{aligned} \quad (2)$$

$$\begin{aligned}\text{command rotational speed } \omega r(n) = \\ \text{command rotational speed } \omega ri(n) + \\ (\text{command position } Pr - \text{detected position } P) \times PosKp2\end{aligned} \quad (3)$$

The subtractor 15 obtains speed error Δω by subtracting detected rotational speed ω from command rotational speed ωr. The PI calculator 16 generates q-axis voltage Vq (command q-axis voltage) by performing PI calculation on speed error Δω according to the following equations (4) and (5). The q-axis voltage Vqi(n) is an integral term and HzKp1 (Hz/deg) and HzKi1 (Hz·s/deg) are proportional gain and integral gain of speed control respectively. The subtracter 15 and PI calculator 16 constitute the speed controller 17.

$$q\text{-axis voltage } Vqi(n) = q\text{-axis voltage } Vqi(n-1) + (\text{command rotational speed } \omega r - \text{detected rotational speed } \omega) \times HzKi1 \quad (4)$$

$$q\text{-axis voltage } Vq(n) = q\text{-axis voltage } Vqi(n) + (\text{command rotational speed } \omega r - \text{detected rotational speed } \omega) \times HzKp1 \quad (5)$$

The current detector 18 composed of A/D converter, and the like, along with the above current sensors 6a, 6b and 6c, constitute a current detector 19. The current detector 18 obtains 3-phase current Ia, Ib, and Ic based on signals outputted from the current sensors 6a, 6b, and 6c. The current converter 20 executes 3-phase to 2-phase transformation and rotational coordinate transformation by applying phase angle θ on the 3 phase currents Ia, Ib, and Ic to obtain detected d-axis current Id and detected q-axis current Iq. The current values are used for obtaining shaft friction as will be described afterwards. The motor controller 1 does not include current feedback loop.

The voltage converter 21 serving as a coordinate converter performs rotational coordinate transformation on the d-axis voltage Vd and q-axis voltage Vq by the following equation (6) and further obtains 3-phase voltage Va, Vb, and Vc by performing 2-phase to 3-phase transformation by the following equation (7). A PWM controller 22 serving as a conductive signal generator uses a dedicated timer to generate commutating signal (3-phase conductive signal) by performing PWM calculation on the phase voltages Va, Vb, and Vc.

$$\begin{pmatrix} V\alpha \\ V\beta \end{pmatrix} = \begin{pmatrix} \cos\theta & -\sin\theta \\ \sin\theta & \cos\theta \end{pmatrix} \begin{pmatrix} Vd \\ Vq \end{pmatrix} \quad (6)$$

$$\begin{pmatrix} Va \\ Vb \\ Vc \end{pmatrix} = \begin{pmatrix} 1 & 0 \\ -\frac{1}{2} & \frac{\sqrt{3}}{2} \\ -\frac{1}{2} & -\frac{\sqrt{3}}{2} \end{pmatrix} \begin{pmatrix} V\alpha \\ V\beta \end{pmatrix} \quad (7)$$

Next, the operation of the present embodiment will be described with reference to FIGS. 3 to 5.

Figure 3:
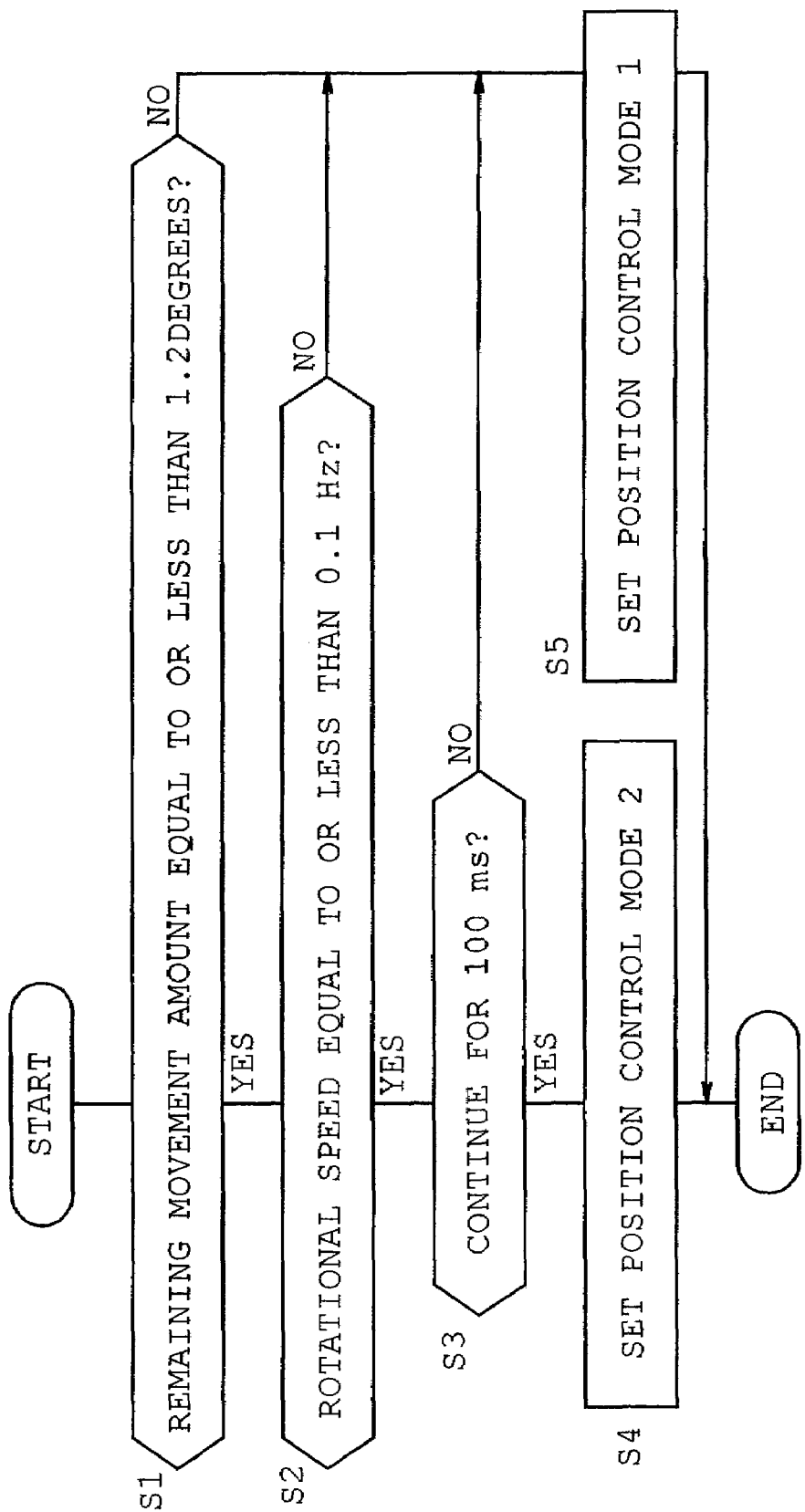
FIG. 3 indicates a flowchart of a mode setting process of positioning control.

FIG. 3 is a flowchart indicating the process flow of the mode specifying process executed by the position controller 11 in the positioning control. As indicated in steps S1 to S3, in case position error ΔP (absolute value) which is the remaining amount of movement from the current position identified as detected position P to command position Pr is equal to or less than a predetermined amount of 1.2 degrees, for example (step S1); rotational speed ω is equal to or less than 0.1 Hz (step S2); and the above described two states continue concurrently for 100 msec or longer (step S3); position control mode 2 is specified by the position controller 11 (step S4). Otherwise, position control mode 1 is specified by the position controller 11 (step S5).

As can be understood from the above conditions, the position controller 11 makes a switch from position control mode 1 to position control mode 2 when reaching a point where there is little movement amount remaining and thus stabilization becomes difficult due to vibration experienced under the conventional control. In position control mode 1, positioning control is executed with P control only without using the I control as indicated in equation (1), in order to reduce control delay. As opposed to this, in control mode 2, positioning control is executed by PI control as indicated in equations (2) and (3). Both control modes control the q-axis voltage Vq based on speed error Δω.

Figure 4A:
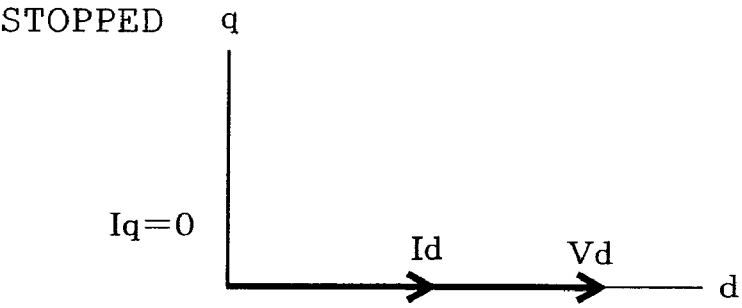
FIG. 4A is a vector diagram of voltage and current when motor is stopped in position control mode 2.
Figure 4B:
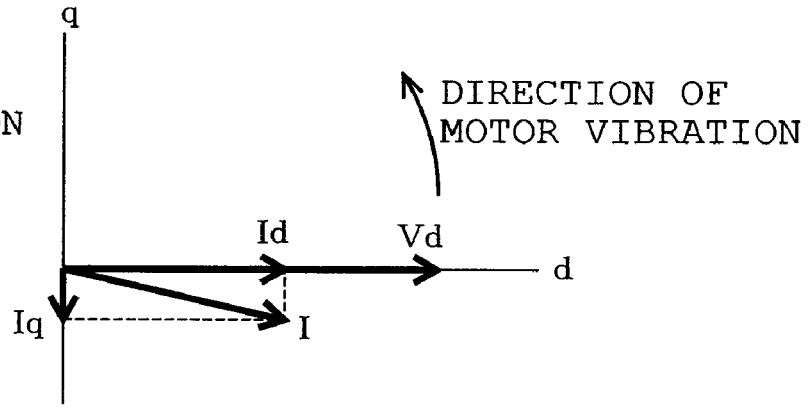
FIG. 4B is a vector diagram of voltage and current when motor is in micromotion in position control mode 2.

FIGS. 4A and 4B are vector diagrams of voltage and current in position control mode 2 indicating the state where q-axis voltage is zero. FIG. 4A indicates the state when the motor is stopped in which case d-axis current Id flows in the same direction as the d-axis voltage Vd and q-axis current Iq is zero. As opposed to this, FIG. 4B indicates the state where the motor 2 is in micromotion in the proximity of command position Pr in which state the phase of current I flowing in the motor 2 by the d-axis voltage is delayed with respect to the d-axis voltage Vd depending upon the behavior of motor 2 vibration. The q-axis current Iq generated by the phase delay causes braking torque in the reverse direction relative to the rotational direction of the motor 2. The braking torque is proportional to rotational speed and increases the braking force acting on the motor 2 in micromotion in the proximity of command position Pr. As a result, settlement of micromotion in the proximity of command position Pr is accelerated to allow high-responsive and high-precision positioning even when rotating a load having a small shaft friction.

FIG. 5 is a chart indicating the test results of positioning control. The chart shows measurement of time taken to stabilize within ±30 seconds of the command position Pr set to a position +180 degrees from the current position P by taking the shaft friction [Nm] as a parameter. Ten motors of the same specification numbered from No. 1 to No. 10 were used in the test and a weight was applied as load on the motor 2. The chart shows the case where positioning control is executed by maintaining position control mode 1 until stablization (d-axis voltage Vd=0V) and the case where positioning control is executed by switching from position control mode 1 to position control mode 2 in accordance with the flowchart indicated in FIG. 3 (d-axis voltage Vd=2V). The exciting voltage 2V specified as the d-axis voltage Vd is 20% of the regular voltage.

The test result shows that stablization time is reduced by the use of position control mode 2. Greater improvement is observed especially under conditions where shaft friction is small and stablization is difficult. For instance, when frictional force is 0.0098 Nm, stablization time is reduced by 24% from 3.28 sec to 2.50 sec.

Based on the above test results, the d-axis voltage Vd specified in position control mode 2 is controlled based on the shaft friction in the present embodiment. For example, the d-axis voltage specifier 14 increases the d-axis exciting voltage in position control mode 2 since amplitude of micromotion in the proximity of command position Pr is increased as the shaft friction is reduced. According to this control, accelerated stabilization can be achieved by generating large braking torque when shaft friction is small. Thus, responsiveness of positioning can be optimized regardless of the amount of shaft friction, thereby providing stability in positioning properties.

The d-axis voltage specifier 14 detects shaft friction based on q-axis current Iq outputted from the current converter 20. More specifically, shaft friction is obtained based on q-axis current during operation under constant speed. The shaft friction can also be calculated by q-axis current Iq during acceleration in positioning control, the change rate (acceleration) of command rotational speed ωr, and total inertia of rotating element.

As described above, the motor controller 1 of the present embodiment controls q-axis voltage Vq by generating command rotational speed ωr based on position error ΔP. Further, if the position error ΔP (absolute value) exceeds the reference value of 1.2 degrees, the d-axis voltage Vd is set to zero (position control mode 1) and if the position error ΔP is equal to or less than the reference value of 1.2 degrees and satisfies a predetermined condition, the d-axis voltage Vd is specified at a predetermined non-zero exciting voltage (position control mode 2). Thus, braking torque can be generated in the reverse direction relative to the rotational direction of the motor 2 in position control mode 2, thereby allowing accelerated settlement of micromotion and high-responsive and high-precision positioning even when shaft friction is small.

The motor controller 1 makes a switch to position control mode 2 when the state in which the position error ΔP (absolute value) is equal to or less than the reference value of 1.2 degrees, and the state in which rotational speed ω is equal to or less than 0.1 Hz continue concurrently for 100 msec or longer. Thus, no switch is made to the position control mode 2 when a large vibration is occurring in the proximity of command position Pr, and switch is made to position control mode 2 after the motion in the proximity of command position Pr has been reduced to micromotion. Thus, the braking torque generated by the application of d-axis voltage can be prevented from reducing the responsiveness.

Since shaft friction is detected based on q-axis current Iq, and d-axis voltage Vd (exciting voltage) in position control mode 2 is increased as the shaft friction is reduced, stabilization time can be optimized to a reduced value independent of the amount of shaft friction. The d-axis voltage Vd for instance may be specified at approximately 20% of a regular voltage and an upper limit may be provided on d-axis voltage Vd as required.

The present invention is not limited to the embodiment described above and illustrated in the drawings but may be modified or expanded as follows.

The switch from position control mode 1 to position control mode 2 may be made under the condition where position error ΔP is equal to or less than the reference value only. Likewise, the switch may be made under the conditions where position error ΔP is equal to or less than the reference value and rotational speed ω is equal to or less than the predetermined value only (in other words without judgment of step S3).

Exciting voltage may be constant instead of being dependent upon shaft friction. The exciting voltage may be changed for each type of detected friction (constant friction, viscous friction, and other types of frictions). Further, a friction detector may be provided that detects friction by various methods unlimited to motor current, based upon which the exciting voltage is specified.

The foregoing description and drawings are merely illustrative of the principles of the present disclosure and are not to be construed in a limited sense. Various changes and modifications will become apparent to those of ordinary skill in the art. All such changes and modifications are seen to fall within the scope of the disclosure as defined by the appended claims.

What is claimed is:

1. A positioning unit for a brushless DC motor comprising:
 a rotational position detector that detects a rotational position of the brushless DC motor;
 a control phase angle generator that generates a control phase angle corresponding to the rotational position detected by the rotational position detector;
 a rotational speed detector that detects a rotational speed based on the rotational position or the control phase angle;
 a position controller that calculates a target rotational speed based on a difference between a target stop position and the rotational position detected by the rotational position detector and that specifies a command d-axis voltage at zero when the difference is greater than a predetermined reference value, and at a predetermined exciting voltage when the difference is equal to or less than the predetermined reference value;
 a speed controller that generates a command q-axis voltage based on a difference between the target rotational speed and the rotational speed detected by the rotational speed detector;
 a coordinate transformer that performs rotational coordinate transformation of the command d-axis voltage and the command q-axis voltage by using the control phase angle to form a three-phase command voltage; and
 a conductive signal generator that generates three-phase conductive signal for the brushless DC motor based on the three-phase command voltage.

2. The positioning unit of the brushless DC motor of claim 1, wherein the position controller specifies the command d-axis voltage to the predetermined exciting voltage when a state where the difference between the target stop position and the rotational position detected by the rotational position detector is equal to or less than the predetermined reference value and a state where the rotational speed detected by the rotational speed detector is equal to or less than a predetermined value continue concurrently for a predetermined time or longer.

3. The positioning unit of the brushless DC motor of claim 1, further comprising a current detector that detects a current of the brushless DC motor; wherein the position controller detects a shaft friction based on the motor current detected by the current detector and specifies the exciting voltage based on the detected shaft friction.

4. The positioning unit of the brushless DC motor of claim 2, further comprising a current detector that detects a current of the brushless DC motor; wherein the position controller detects a shaft friction based on the motor current detected by the current detector and specifies the exciting voltage based on the detected shaft friction.

5. The positioning unit of the brushless DC motor of claim 3, wherein the position controller increases the exciting voltage as the detected shaft friction becomes smaller.

6. The positioning unit of the brushless DC motor of claim 4, wherein the position controller increases the exciting voltage as the detected shaft friction becomes smaller.

* * * * *